US010490157B2

(12) United States Patent
Philipp

(10) Patent No.: US 10,490,157 B2
(45) Date of Patent: Nov. 26, 2019

(54) COMPRESSION OF DISTORTED IMAGES FOR HEAD-MOUNTED DISPLAY

(71) Applicant: Screenovate Technologies Ltd., Raanana (IL)

(72) Inventor: Sagiv Philipp, Raanana (IL)

(73) Assignee: Screenovate Technologies Ltd., Raanana (IL)

(*) Notice: Subject to any disclaimer, the term of this patent is extended or adjusted under 35 U.S.C. 154(b) by 45 days.

(21) Appl. No.: 15/859,930

(22) Filed: Jan. 2, 2018

(65) Prior Publication Data
US 2018/0190236 A1    Jul. 5, 2018

Related U.S. Application Data

(60) Provisional application No. 62/441,765, filed on Jan. 3, 2017.

(51) Int. Cl.
G09G 5/00      (2006.01)
H04N 19/182    (2014.01)
H04N 19/136    (2014.01)
H04N 19/154    (2014.01)
H04N 19/103    (2014.01)
H04N 19/167    (2014.01)
G09G 3/00      (2006.01)

(52) U.S. Cl.
CPC ............ G09G 5/005 (2013.01); G09G 3/002 (2013.01); G09G 5/006 (2013.01); H04N 19/103 (2014.11); H04N 19/136 (2014.11); H04N 19/154 (2014.11); H04N 19/167 (2014.11); H04N 19/182 (2014.11); G09G 2340/02 (2013.01); G09G 2340/0407 (2013.01); G09G 2354/00 (2013.01); G09G 2370/12 (2013.01); G09G 2370/16 (2013.01)

(58) Field of Classification Search
CPC ................ G02B 13/06; G02B 27/0025; G02B 27/4216; G06T 2207/10024; G06T 5/006; G06T 3/0018; G06T 3/0062; H04N 5/23238; H04N 5/2628; H04N 19/167; H04N 19/176; G06K 2009/363
See application file for complete search history.

(56) References Cited

U.S. PATENT DOCUMENTS

| 9,094,681 | B1* | 7/2015 | Wilkins | H04N 19/119 |
| 2011/0109792 | A1* | 5/2011 | Montag | H04L 65/602 348/390.1 |
| 2011/0234475 | A1* | 9/2011 | Endo | G02B 27/017 345/8 |
| 2017/0302918 | A1* | 10/2017 | Mammou | H04N 19/103 |

* cited by examiner

Primary Examiner — Haixia Du
(74) Attorney, Agent, or Firm — M&B Analysts, LLC

(57) ABSTRACT

A method and device for distorted compression of images displayed over a head mounted display (HMD) are provided. The method includes receiving, at a sink device, an image from a source device over a transport medium; determining, based on the optical means of the HMD, a circumscribed circle of the received image; determining a compression ratio based on at least radial attributes of the received image; and compressing, using a compression process, pixels inside the circumscribed circle of the received image, wherein the compression is based on the determined compression ratio.

23 Claims, 5 Drawing Sheets

COMPRESSION OF DISTORTED IMAGES FOR HEAD-MOUNTED DISPLAY

CROSS REFERENCE TO RELATED APPLICATIONS

This application claims priority from U.S. Provisional Application No. 62/441,765 filed on Jan. 3, 2017.

TECHNICAL FIELD

The present disclosure generally relates to image compression, and more particularly to compression of distorted images to be displayed on a HMD.

BACKGROUND

Head mounted displays (hereinafter "HMDs") are often used as visual displays. HMDs are used, for example, for playing games in a virtual three-dimensional space, for simulating the interior of a building, and in various other fields. Typically, an HMD includes a small liquid-crystal display (LCD) for displaying images, an optical means for guiding the images projected on this LCD toward both eyes, and position sensors for detecting the position and direction of the head. The computer connected to the HMD determines the position and direction of the head based on signals received from the position sensors, and presents the LCD with video signals corresponding to the position and direction of the head. This allows the user wearing an HMD to experience the same sensation as when scanning a wide three-dimensional space.

In current implementations, the computer is coupled to the HMD using one or more cables. Typically, the sensory signals are communicated over a USB cable while the video signals are communicated over a HDMI cable. While the cables do provide a secure connection between the signals, the wired connections may be inconvenient and cumbersome for the user in certain situations.

Currently, there is an attempt in the industry to provide a solution that de-couples the HMD from the computer. That is, a wireless HMD device that would be able to communicate with the computers over the air. However, wireless HMDs are immature, inefficient, and thus are not commercially available. One of the reasons for such deficiencies is the low latency and high data rate that is required to display a video on a HMD.

Thus, in order to allow wireless transmission of video signals from a computer to a HMD, it is desirable to reduce the data rate with minimum latency while preserving the high quality of the video. One technique for reducing the data rate is using image (or video frame) compression. However, a straightforward image compression would not be optimized due to the specific structure of the optical means in the HMD. Further, straightforward image compression would usually introduce unacceptable latency and/or require additional circuitry for decoding, which increases the total cost of the HMD.

Geometric distortion is a type of optical distortion that occurs in HMDs. The two common types of geometric distortion are barrel distortion and pincushion distortion. Barrel distortion typically occurs when straight lines are curved inwards in a shape of a barrel. This type of distortion is commonly seen on wide angle lenses, because the field of view of the lens is much wider than the size of the image. As an example, FIG. 1A shows an image 100 as rendered by a computer and FIG. 1B is the image 100 in its barrel distortion form as shown on the HMD. In a pincushion distortion, image magnification increases with the distance from the optical axis. The visible effect is that lines that do not go through the center of the image are bowed inwards, towards the center of the image. The pincushion distortion occurs due to the binoculars-like shape of the HMD.

Further, due to optical attributes of HMD's lenses and display the images are displayed as fisheye images. That is, information is displayed in the circumscribed circle, while peripheral areas are "blacked" out. A fisheye image is depicted FIG. 1A.

Another optical phenomenon specific structure of the optical means in the HMDs is a chromatic distortion (aberration). This type of an effect resulting from dispersion in which there is a failure of a lens to focus all colors to the same convergence point. This type of distraction is illustrated in FIGS. 2A and 2B. FIG. 2A shows an image 200 as rendered by a computer and FIG. 2B is the image 200 in its chromatic distortion form as shown on the HMD. As depicted in FIG. 2B, each "white" point 210 is displayed as the three colored components (Red 221, Green 222, Blue 223).

When rendering images to be displayed on the HMDs, the above-mentioned distortions are considered. That is, a different distortion function would be typically applied to each color component when rendering the image. However, compressing images without considering the various distortions functions would result in an image that cannot be properly displayed on the HMD or with an inefficient compression. That is, currently available compression techniques are not optimized to meet the constraints noted above.

Therefore, it would be advantageous to provide a compression solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a method for distorted compression of images displayed over a head mounted display (HMD). The method comprises receiving, at a sink device, an image from a source device over a transport medium; determining, based on the optical means of the HMD, a circumscribed circle of the received image; determining a compression ratio based on at least radial attributes of the received image; and compressing, using a compression process, pixels inside the circumscribed circle of the received.

Some embodiments disclosed herein also include a device for distorted compression of images displayed over a head mounted display (HMD). The device comprises a processing circuitry; and a memory, the memory containing instructions that, when executed by the processing circuitry, configure the device to: receive an image from a source device over a transport medium; determine, based on the optical means of the HMD, a circumscribed circle of the received image; determine a compression ratio based on at least radial attributes of the received image; and compress, using a compression process, pixels inside the circumscribed circle of the received image, wherein the compression is based on the determined compression ratio.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1A:
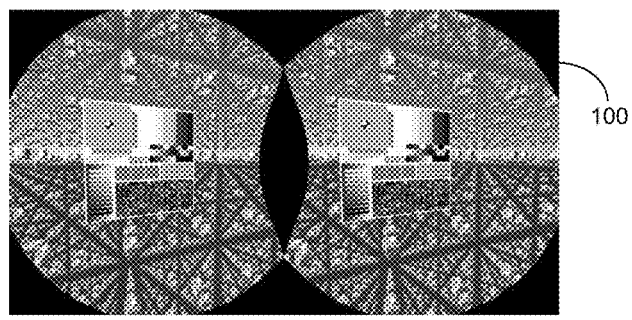
FIGS. 1A and 1B are images depicting the barrel distortion.
Figure 1B:
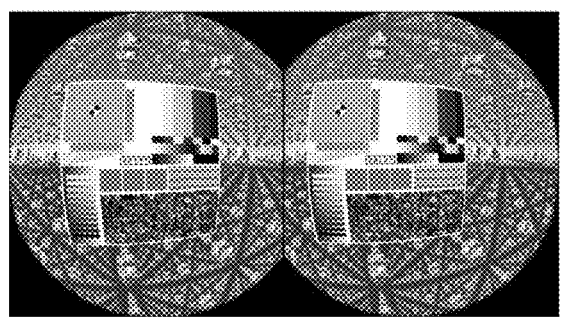

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 3:
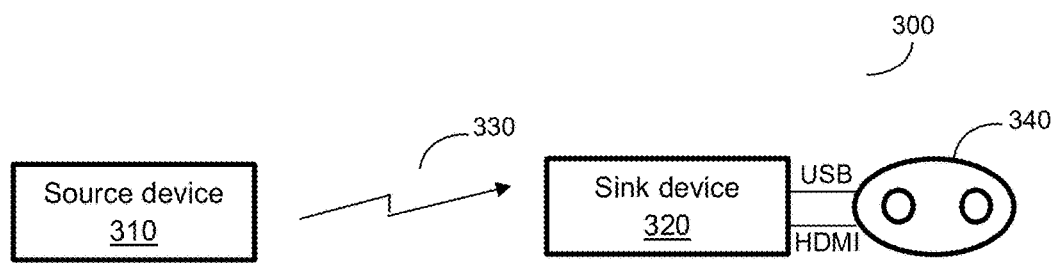
FIG. 3 illustrates a wireless connection to a HMD utilized to describe the various disclosed embodiments.

FIG. 3 shows an example diagram 300 illustrating a wireless connection to a HMD according to an embodiment. As illustrated in FIG. 3, a source device 310 is communicatively connected to a sink device 320 over a wireless medium 330. The sink device 320 is coupled to a HMD 340. The communication over the wireless medium 330 may be achieved using wireless protocols including, but not limited to, Wi-Fi (covered by the IEEE 802.11b/g/n communication standards), WiGig® (covered by the IEEE 802.11ad communication standards), and the like.

The source device 310 may include, but is not limited to, a personal computer, a laptop computer, a tablet computer, a smartphone, a gaming console, and the like. In certain configurations, the source device 310 may be realized as a chipset integrated or coupled to any of these devices. According to the disclosed embodiments, the source device 310 is configured to render and compress (encode) video signals and transmit the video signals over the wireless medium 330 to the sink device 320. In some configurations the sink device 320 is integrated in HMD 340.

In an embodiment, the compression is a distorted compression discussed in detail below. In yet another embodiment, the distorted compression and rendering processes are performed in a single pass, thus significantly reducing the processing time of rendered video signals. It should be noted that the transmission of the video signal of the wireless (physical) medium is performed based on the respective wireless protocols. That is, such transmission must meet at least the bandwidth, latency, and packet structure requirements set by the respective wireless protocols.

The sink device 320 is coupled to the HMD 340 using cables, such as HDMI®, Display Port, USB, and the like. In certain embodiments, the sink device 320 is realized as a chipset connected to the HMD 340. In an embodiment, the sink device 320 is configured to receive the video signals over the wireless medium 330, de-compress (decode) the received signals, and display the de-compressed signals on the HMD 340. In an embodiment, the decompression or decoding is performed based on the compression performed by the source device 310.

The HMD 340 is conventionally structured to include a small liquid-crystal display (LCD) for displaying images, an optical means (lenses) for guiding the images projected on this LCD toward both eyes, and position sensors for detecting the position and direction of the head. The sensory signals are transmitted to the source device 310 by the sink device 320. The source device 310 is configured to determine the position and direction of the head based on the sensory signals, and render video signals corresponding to the position and direction of the head. The components of the HMD 340 are not shown in FIG. 3.

According to the disclosed embodiments, in order to allow efficient transmission over the wireless medium 330, so that video can be continuously displayed on the HMD, distorted compression is performed at the source device 310, and its respective decompression at the sink device 320.

The disclosed distorted compression is designed to compress images (e.g., video frames) while considering the bandwidth over the wireless medium 330, fovea, geometric distortion, and the chromatic distortion. The available bandwidth determines, in part, the compression ratio of each frame. To meet the fovea constraint, the distorted compression is designed to ensure that the low compression ratio (thus high quality) is at the direction of the gaze and thus the eye fovea. Further, a high compression ratio (thus low quality) is at all directions other than the fovea.

The geometric distortion is caused due to the optical properties of the optical means (lens) in the HMD. As noted above, two common types of distortions: barrel and pincushion may occur in the displayed image. Both types of distortions are substantially radial, i.e., the amount of distortion is a function of how far a pixel is relative to the optical axis (e.g. the center of the lens). As such, the quality of a peripheral area in an image is relatively low. Thus, according to an embodiment, the distorted compression compresses the images based on the distorted (radial) function. That is, the compression ratio would be a function of the distance of a pixel from the center of the lens, where centered pixels are compressed with a lower compression ratio than "peripheral" pixels. It should be noted the distortion (radial) function is different from one optical lens to another.

The chromatic distortion causes a white dot to be broken up to its primary colors (red, green, blue) when passing through the optical system. The chromatic distortion function is different from one optical means (or lens) to another. According to the disclosed embodiment, the distorted compression utilizes the chromatic distortion function to minimize the color artifacts in an image displayed on the HMD optics.

According to one embodiment, the distortion functions are provided by a vendor of the optical means. The distortion functions may include the geometric and chromatic functions for each RGB color.

In another embodiment, the distortion functions are determined during a calibration process. The calibration process may be performed at a lab to determine the distortion functions of different types of optical means commonly installed in HMDs. Alternatively or collectively, the calibration process may be performed when the source device 310 is initially connected to the sink device 320, for example, upon the setting of the system illustrated in FIG. 3.

In an example embodiment, in order to determine a geometric distortion function, the calibration process includes comparing a "source image" to a "sink image". A source image is an image generated by the source device 310 and a sink image is the corresponding image produced by the sink device 320. The calibration process is configured to measure a location (x, y coordinates) of each pixel in the source (undistorted) image and the sink (distorted) image. The distortion function is determined based on these measures. As an example, a geometric distortion function typically has the following form:

$$x_d = x_u(1 + K_1 r^2 + K_1 r^4 + \ldots)$$

$$y_d = y_u(1 + K_1 r^2 + K_1 r^4 + \ldots)$$

$$r = \sqrt{(x_u - x_c)^2 + (y_u - y_c)^2}$$

Where, $(x_d, y_d)$ is a sink (distorted) image pixel; $(x_u, y_u)$ is a source (undistorted) image pixel, r is the radial distance, $(x_c, y_c)$ is a pixel (point) indicating the center of the distortion, and $K_i (i=1, \ldots, n)$ are the radial distortion coefficient.

It should be emphasized that the calibration process is performed merely to determine the distortion function(s). The disclosed compression method can be performed without executing the calibration process. The disclosed compression method can be preconfigured with the distortion function(s).

In an embodiment, the above determined function is computed for each basic color consisting in a pixel. Thus, creating the chromatic aberration for each of such color (Red, Green, Blue) for each function.

Figure 4:
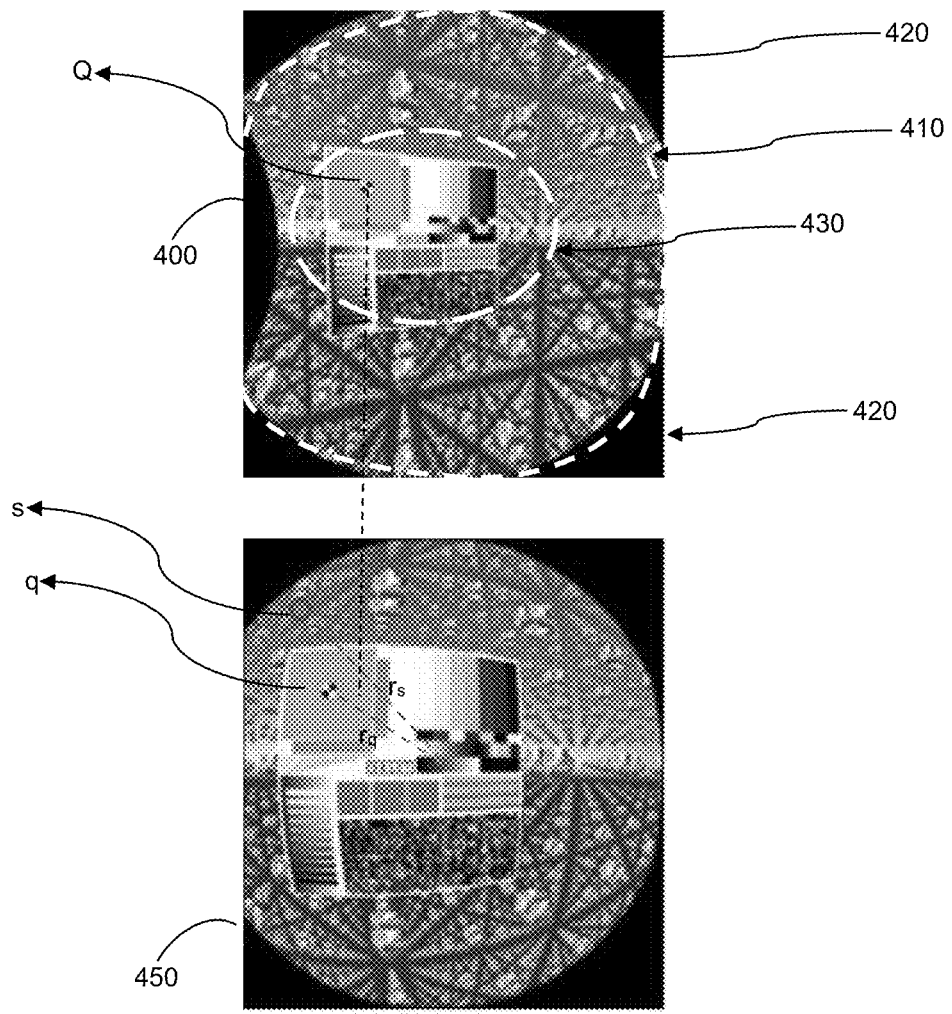
FIG. 4 illustrates source and distorted images utilized to describe the various disclosed embodiments.

According to the disclosed embodiment, in order to perform the distorted compression, the source device 310 is configured to analyze each source image to determine the circumscribed circle in the image. As demonstrated in FIG. 4, a source image 400 is a kind of a fisheye image where information is displayed in the circumscribed circle 410, while all peripheral areas 420 outside of the circle 410 are blacked out.

According to an embodiment, the source device 310 does not compress the areas 420, or transmit information from the peripheral areas 420 to the sink device 320, or both. That is, the source device 310 is configured to compress and/or transmit only information in the circumscribed circle 410.

The source device 310 is further configured to determine the fovea area in the source image. In an embodiment, the fovea area is determined using an assumption that the gaze direction is straight. In another embodiment, the fovea area may be determined based on the sensory signals received from the HMD 340. As noted above, such signals provide information on the position and direction of the head of the device HMD's 340 wearer. As illustrated in the example FIG. 4, a fovea area is bordered by a circle 430.

According to the disclosed embodiment, all pixels enclosed in the fovea area are compressed using a lower compression ratio relative to pixels outside of this area. That is, a pixel inside the fovea area will be represented with more bits relative to a pixel outside of the area. The compression ratio is determined based on the allocated bandwidth (bits/second). A different bandwidth may be allocated (or available) for each different source image (frame). The allocated bandwidth may be based on the type of the wireless modem (not shown) being utilized for the transmission, the current condition of the wireless channel, and so on.

The source device 310 is further configured to process a source image in order to generate a distorted image respective thereof. To this end, the distortion function is applied on each pixel in the source image to determine the coordinates (and the thus the radial distance) of the pixel in a distorted image (or sink image as noted above). The distortion function is determined based on the optical means of the HMD 340. In an embodiment, only pixels in the circumscribed circle 410 are processed.

Returning to FIG. 4, as an example, an image 400 is an undistorted image while an image 450 is a distorted image. A pixel 'Q' in the source image 400 will have a smaller radial distance than the corresponding of the pixel 'q', in the distorted image 450.

According to the disclosed embodiment, the compression ratio of each pixel is based on its radial distance in the distorted image. The longer the radial distance, the higher the compression ratio. That is, a pixel with a short radial distance is represented with more bits relative to a pixel with a relative large distance. In the example shown in FIG. 4, the pixel 'q' is compressed with a lower compression ratio than the pixel 's' as the radial distance $r_q$ is smaller than $r_s$. As discussed above, the compression ratio is further determined based on the allocated bandwidth (bits/second) for the source image.

According to an embodiment, the source device 310 is further configured to apply a chromatic aberration function of only a single color on each pixel. For example, only a red-colored chromatic aberration function can be applied on all pixels in the source image. Once all pixels are distorted using that function, the pixels are compressed and the image is transmitted to the sink device. In this embodiment, the compression ratio of a pixel may be determined based on its radial distance as noted above. In an embodiment, only pixels in the circumscribed circle 410 are processed.

Figure 2A:
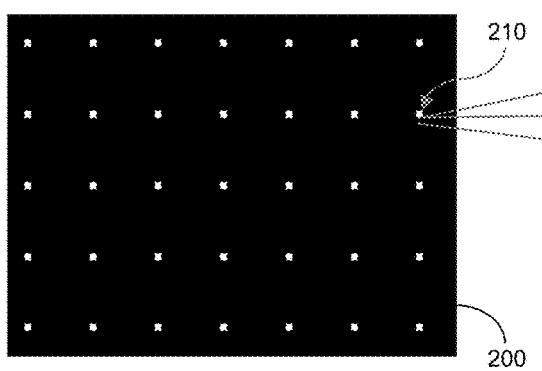
FIGS. 2A and 2B are images depicting the chromatic distortion.
Figure 2B:
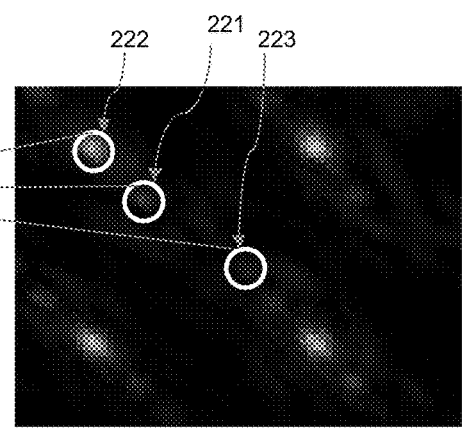

In the sink device 320, each pixel will be separated into its 3 points, each point being one of the 3 basic colors, red, green and blue (an example is provided in FIG. 2B). To compensate for the chromatic distortion at the sink device 320, the location of each color's point is offset respective to the color utilized for chromatic distortion. For example, if the red chromatic aberration function utilized to distort the pixel, the blue and green points are shifted respective to the red point. The shift is a constant value that can be determined from the chromatic aberration functions of all 3 colors. As noted above, the sink device 320 and the source 310 can be configured with these functions as they are based on the type of optical means installed in the HMD 340.

According to the disclosed embodiments various compression techniques can be utilized to compress the source image where the compression ratio to apply on each image and pixel is based on the methods discussed above. Examples of such compression techniques include, but are not limited to, texture compression, block compression, JPEG, PNG, and the like. When compressing a series of frames (images), MPEG compression can be utilized. One of ordinary skill would be familiar with these techniques.

In an embodiment, the sink device 320 is configured to decompress the received image based on the respective compression technique utilized by the source device and the distortion functions. The decompressed image is rendered and displayed on the HMD 340. In an embodiment, the decompression and rendering is performed in one pass.

It should be noted that the distorted compression discussed above can be performed by utilizing any of, or any combination of, the fovea, geometric distortion, and chromatic aberration. For example, the distorted compression may include only compressing pixels in the fovea using the geometric distortion, but without applying the chromatic aberration. As another example, the distorted compression may include applying geometric distortion with the chromatic aberration on all pixels regardless of the fovea area.

It should be noted that the same distorted compression techniques disclosed herein can be performed regardless of the type of the medium between the source and the sink devices. That is, the disclosed techniques are applicable to a wired or wireless medium. Further, the disclosed compression techniques are agnostic to the type of transport protocol being utilized to communicate data between the source and the sink device.

Figure 5:
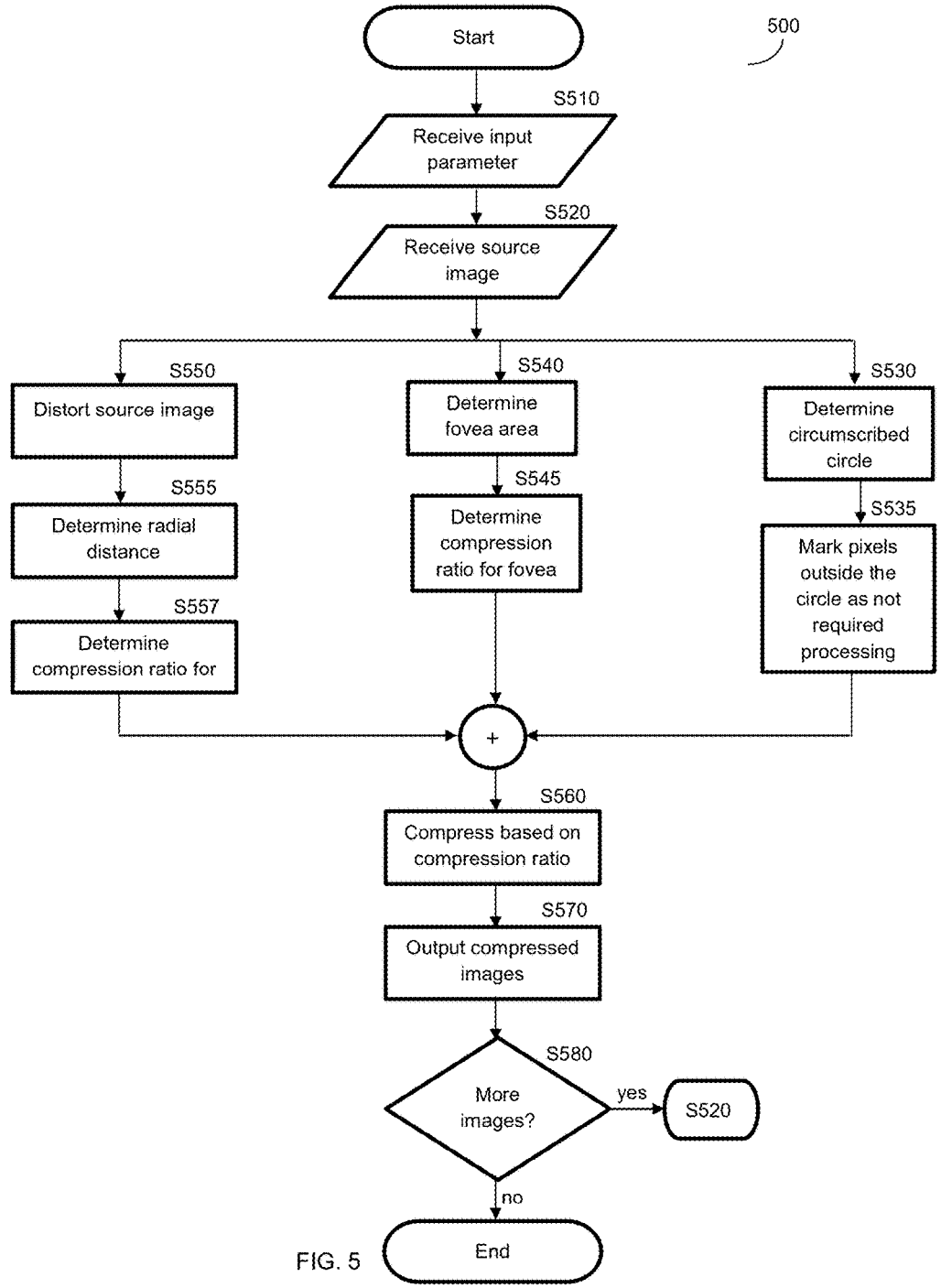
FIG. 5 is a flowchart of the distorted compression method according to an embodiment.

FIG. 5 is an example flowchart 500 illustrating the operation of a distorted compression method according to an embodiment. At S510, various parameters require to perform compression are input. Such parameters may include, for example, the allocated (available) bandwidth, various distortion functions of the HMD, and optical parameters of the HMD's optical means.

At S520, a source image is received. The source image is typically rendered by the source sink. For example, a gaming application can render the source image.

At S530, at least the circumscribed circle in the source image is determined. This can be performed using the optical parameters of the HMD's optical means. At S535, all pixels outside of the circumscribed circle are marked as not requiring processing and/or transmission to the source device.

At S540, the fovea area in the source image is determined. As noted above such determination may be performed based on the assumption that the gaze direction is straight. In another embodiment, the fovea area may be determined based on sensory signals received from the HMD. Such signals provide an indication on the gaze direction. In an embodiment, at S545, the compression ratio of each pixel is determined based on its location relative to the fovea area. That is, the compression ratio of a pixel outside of the fovea area would be higher than a pixel inside that area. The compression ratio is a function of the allocated bandwidth.

At S550, the source image is distorted using a geometric distortion function. In an embodiment, the image is distorted using on a chromatic aberration function of a single basic color. At S555, the radial distance of each pixel in the distorted image is determined. For example, the distance can be computed based on the respective distortion function.

At S557, the compression ratio of each pixel is determined based on its radial distance. The shorter the radial distance, the lower the compression ratio is. The compression ratio is also a function of the allocated bandwidth.

In embodiments, S530-S535, S540-S545, and S550-S557 can be performed in parallel or a different order than the order discussed above. In a further embodiment, the method can be performed using only one or more of S530-S535, S540-S545, and S550-S557.

At S560, the source image is compressed using a predetermined compression technique and the determined compression ratio determined for each pixel. In an example embodiment, the compression ratio is the maximum between the ratios computed or determined for the Fovea distance and the radial distance. In yet another example embodiment, the compression ratio is the maximum between the ratios computed or determined for the Fovea distance and the radial distance. In some embodiments, the distorted image is compressed, thus providing distortion and compression at one path. Examples for such compression techniques are discussed above.

At S570, the compressed (distorted) image is output. At S580, it is checked if additional source images are available. If so, execution returns to S520; otherwise, execution ends.

Figure 6:
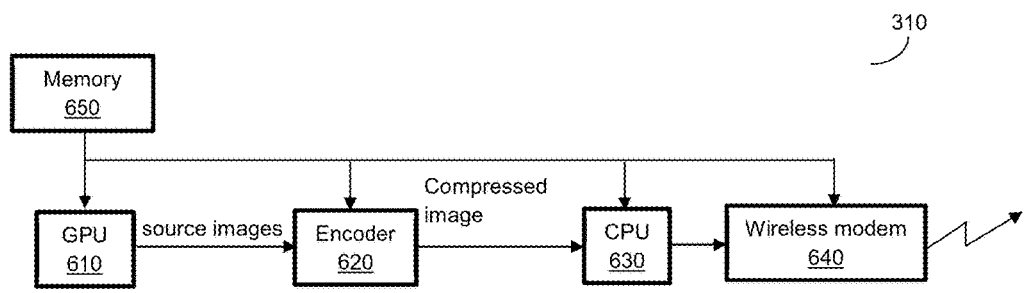
FIG. 6 is a block diagram of a source device implemented according to an embodiment.

FIG. 6 shows an example block diagram of a source device 310 implemented according to an embodiment. The source device 310 includes a graphics processing unit (GPU) 610, an encoder 620, a central processing unit (CPU) 630, a wireless modem 640, and a memory 650 coupled to each other as shown in FIG. 6.

The GPU 610 renders the source images that are input to the encoder 620. The encoder 620 is configured to generate a compressed and distorted image based on the source images. To this end, the encoder 620 implements the distorted compression discussed in detail above. The CPU 630 processes the output of the encoder 620 into bit streams that are wirelessly transmitted to the sink device by the wireless modem 630.

The memory 650 may be shared by the various components and/or by a local memory of each component. The memory 650 may also include machine-readable media for storing software. Software shall be construed broadly to mean any type of instructions, whether referred to as software, firmware, middleware, microcode, hardware, description language, or otherwise. Instructions may include code (e.g., in source code format, binary code format, executable code format, or any other suitable format of code). The instructions are executed by the GPU 610, the encoder 620, and/or the CPU 630.

The GPU 610, the encoder 620, and/or the CPU 630 can be realized as software, hardware, or any combination thereof. A hardware element may be realized as any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware, finite state machines, or any other suitable entities that can perform calculations or other manipulations of information.

The wireless modem 640 transmits and receives wireless signals in accordance with a wireless protocol. The wireless protocol may include Wi-Fi (covered by the IEEE 802.11b/g/n communication standards), WiGig® (covered by the IEEE 802.11ad communication standards), and the like. The wireless modem 640 typically includes an RF circuitry (not shown) and an array of antennas (not shown).

Figure 7:
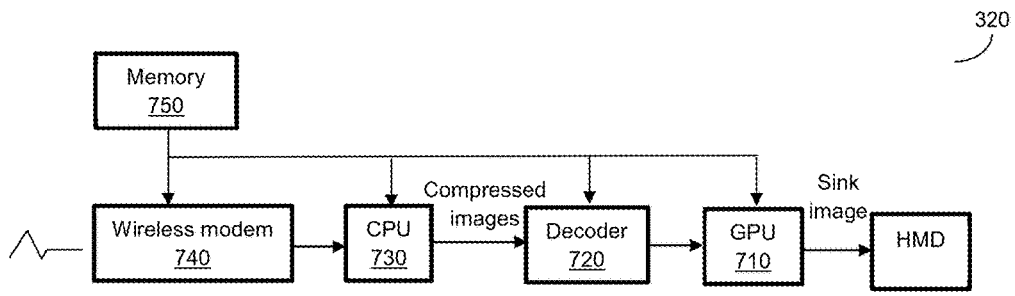
FIG. 7 is a block diagram of a sink device implemented according to an embodiment.

FIG. 7 shows an example block diagram of a sink device 320 implemented according to an embodiment. The sink device 320 includes a graphics processing unit (GPU) 710, a decoder 720, a central processing unit (CPU) 730, a wireless modem 740, and a memory 750 coupled to each other as shown in FIG. 6.

The wireless modem 740 receives RF signals encapsulating the bit streams transmitted by the source device 310. The CPU 730 processes the bit streams to generate the compressed (and distorted) image. The decoder 720 is configured to compress the input image based on the compression technique utilized at the source. In an embodiment, the decoder 720 performs the chromatic correction as discussed above. The decompressed image is fed to the GPU 710 that renders the image to be displayed on the HMD.

The memory 750 may be shared by the various components and/or by a local memory of each component. The memory 750 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions are executed by the GPU 710, the decoder 720, and/or the CPU 730.

The GPU 710, the encoder 720, and/or the CPU 730 can be realized as software, hardware, or any combination thereof. A hardware element may be realized as any combination of general-purpose microprocessors, multi-core processors, microcontrollers, DSPs, FPGAs, PLDs, controllers, state machines, gated logic, discrete hardware components, dedicated hardware, finite state machines, or any other suitable entities that can perform calculations or other manipulations of information.

The wireless modem 740 transmits and receives wireless signals in accordance with a wireless protocol. The wireless protocol may include Wi-Fi (covered by the IEEE 802.11b/g/n communication standards), WiGig® (covered by the IEEE 802.11ad communication standards), and the like. The wireless modem 740 typically includes an RF circuitry (not shown) and an array of antennas (not shown).

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for distorted compression of images displayed over a head mounted display (HMD), comprising:
    receiving, at a sink device, an image from a source device over a transport medium;
    determining, based on an optical means of the HMD, a circumscribed circle of the received image;
    determining a compression ratio, as a function of a first compression ratio and a second compression ratio, based on at least radial attributes of the received image by:
        distorting the received image;
        determining a radial distance of each pixel in the distorted image;
        computing using a distorted function as a radial distance of each pixel; and
        determining the second compression ratio for each pixel based on a location of the pixel relative to a fovea area, wherein the second compression ratio of a pixel corresponds to the radial distance of the pixel; and
    compressing, using a compression process, pixels inside the circumscribed circle of the received image, wherein the compression is based on the determined compression ratio.

2. The method of claim 1, further comprising determining the first compression ratio:
    determining the fovea area in the received image; and
    determining the first compression ratio for each pixel based on a location of the pixel relative to the fovea area, wherein a compression ratio of a pixel outside of the fovea area is higher than a pixel inside the fovea area.

3. The method of claim 2, wherein determining the fovea area further comprising:
    receiving at least a sensory signal indicating a gaze direction of a user wearing the HMD.

4. The method of claim 3, wherein the distortion of the image is a geometric distortion and the distortion is a chromatic aberration function of a single basic color.

5. The method of claim 4, further comprising:
    calibrating the sink device to determine the distortion function and the values of the function.

6. The method of claim 3, wherein the compression ratio is the function of a maximum value between the first compression ratio and the second compression ratio.

7. The method of claim 1, wherein further comprising:
    adjusting the compression ratio based on an available bandwidth on the transport medium.

8. The method of claim 1, wherein the transport medium is at least a wireless medium.

9. The method of claim 1, wherein the image is any type of multimedia content received from the source device.

10. The method of claim 1, wherein the compression process includes at least any one of: a texture compression, a block compression, a JPEG, a PNG, and a MPEG compression.

11. The method of claim 1, wherein the sink device is connected to the HMD.

12. A non-transitory computer readable medium having stored thereon instructions for causing one or more processing circuitry to execute a process for distorted compression of images displayed over a head mounted display (HMD), comprising:
receiving, at a sink device, an image from a source over a transport medium;
determining, based on an optical means of the HMD, a circumscribed circle of the received image;
determining a compression ratio, as a function of a first compression ratio and a second compression ratio, based on at least radial attributes of the received image by:
distorting the received image;
determining a radial distance of each pixel in the distorted image;
computing using a distorted function a radial distance of each pixel; and
determining the second compression ratio for each pixel based on a location of the pixel relative to a fovea area, wherein the second compression ratio of a pixel corresponds to the radial distance of the pixel; and
compressing, using a compression process, pixels inside the circumscribed circle of the received image, wherein the compression is based on the determined compression ratio.

13. A device for distorted compression of images displayed over a head mounted display (HMD), comprising:
a processing circuitry; and
a memory, the memory containing instructions that, when executed by the processing circuitry, configure the device to:
receive an image from a source device over a transport medium;
determine, based on an optical means of the HMD, a circumscribed circle of the received image;
determine a compression ratio, as a function of a first compression ratio and a second compression ratio, based on at least radial attributes of the received image
distort the received image;
determine a radial distance of each pixel in the distorted image;
compute using a distorted function a radial distance of each pixel; and
determining the second compression ratio for each pixel based on a location of the pixel relative to a fovea area, wherein the second compression ratio of a pixel corresponds to the radial distance of the pixel; and
compress, using a compression process, pixels inside the circumscribed circle of the received image, wherein the compression is based on the determined compression ratio.

14. The device of claim 13, wherein the device is further configured to:
determine the fovea area in the received image; and
determine the first compression ratio for each pixel based on a location of the pixel relative to the fovea area, wherein a compression ratio of a pixel outside of the fovea area is higher than a pixel inside the fovea area.

15. The device of claim 14, wherein the device is further configured to:
receive at least a sensory signal indicating a gaze direction of a user wearing the HMD.

16. The device of claim 15, wherein the distortion of the image is a geometric distortion and the distortion is a chromatic aberration function of a single basic color.

17. The device of claim 15, wherein the compression ratio is the function of a maximum value between the first compression ratio and the second compression ratio.

18. The device of claim 15, wherein the device is further configured to:
adjust the compression ratio based on an available bandwidth on the transport medium.

19. The device of claim 13, further comprising:
a wireless medium for at least communicating with the source device over the transport medium.

20. The device of claim 19, wherein a communication protocol carried by the wireless medium is at least an IEEE 802.11ad communication standard.

21. The device of claim 19, further comprising:
a decoder circuitry configured to decode the received image; and
a graphical processing unit configured to render an image to be displayed on the HMD.

22. The device of claim 13, wherein the compression process includes at least any one of: a texture compression, a block compression, a JPEG, a PNG, and a MPEG compression.

23. The device of claim 13, wherein the device is a sink device connected to the HMD.

* * * * *